June 5, 1956  D. O. FORD  2,748,813
GRIPPING, CUTTING AND PUSHING TREE FELLING MACHINE
Filed Nov. 23, 1953  4 Sheets-Sheet 1
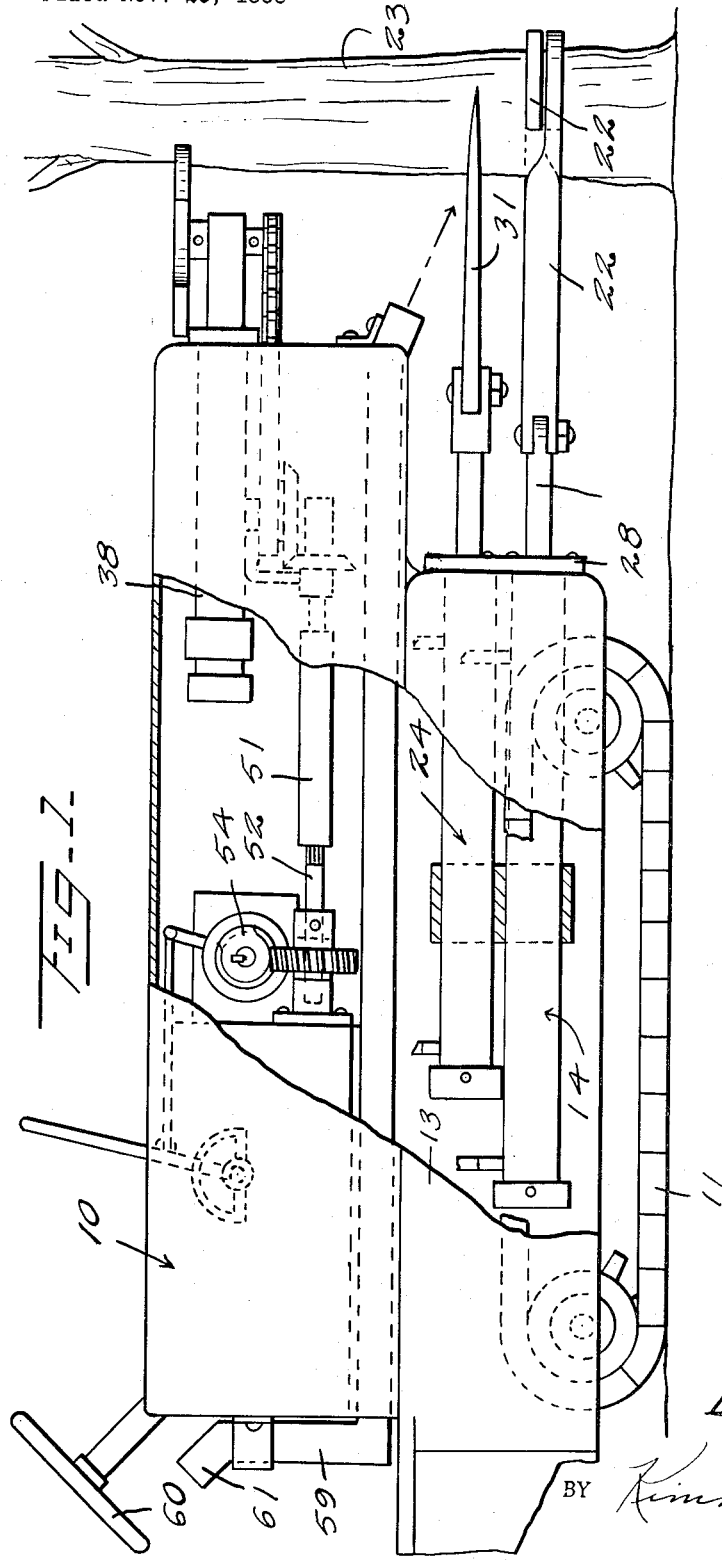
INVENTOR
*D. O. Ford*
BY *Kimmel & Crowell*
ATTORNEYS

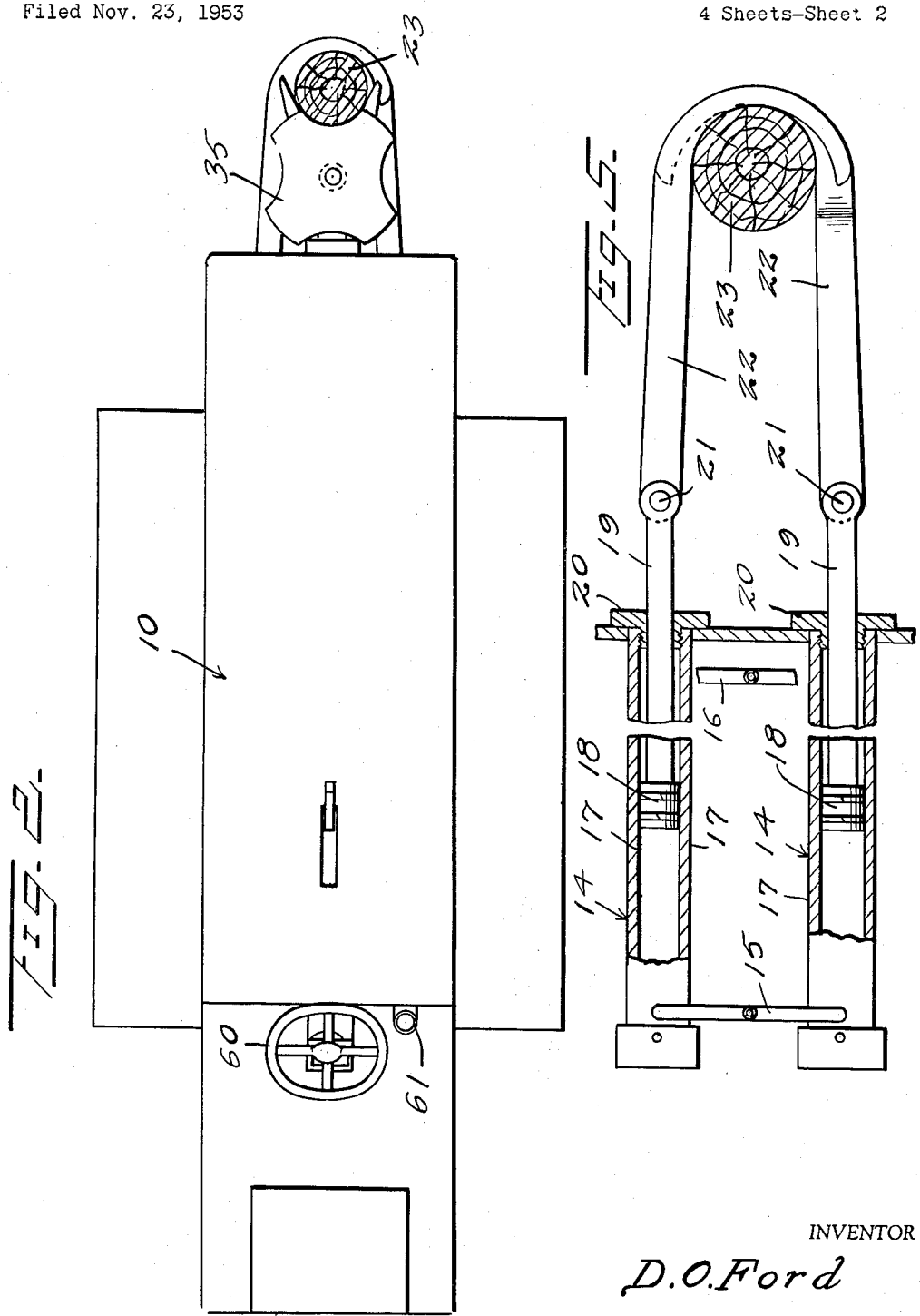

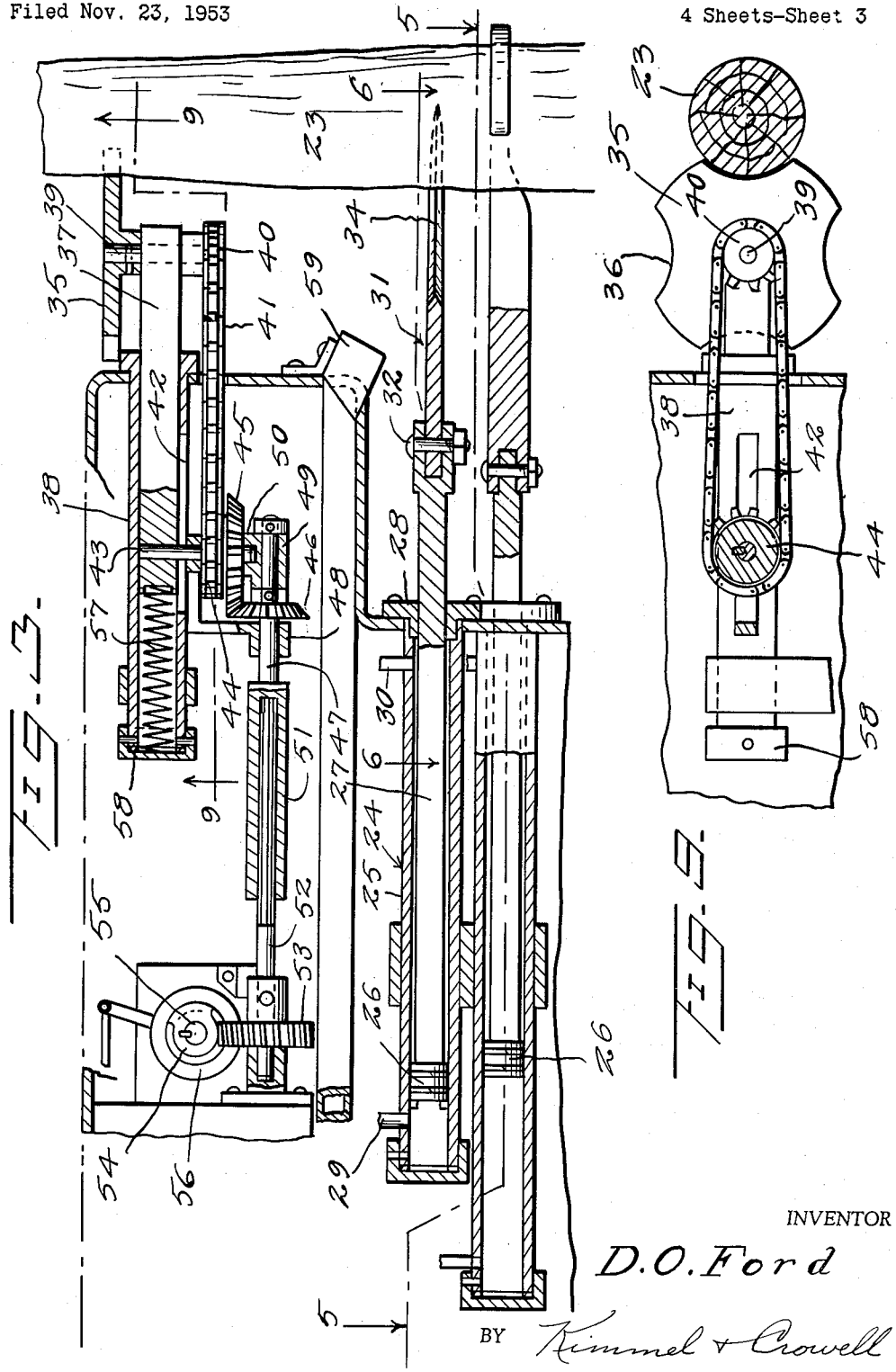

June 5, 1956 D. O. FORD 2,748,813
GRIPPING, CUTTING AND PUSHING TREE FELLING MACHINE
Filed Nov. 23, 1953 4 Sheets-Sheet 4
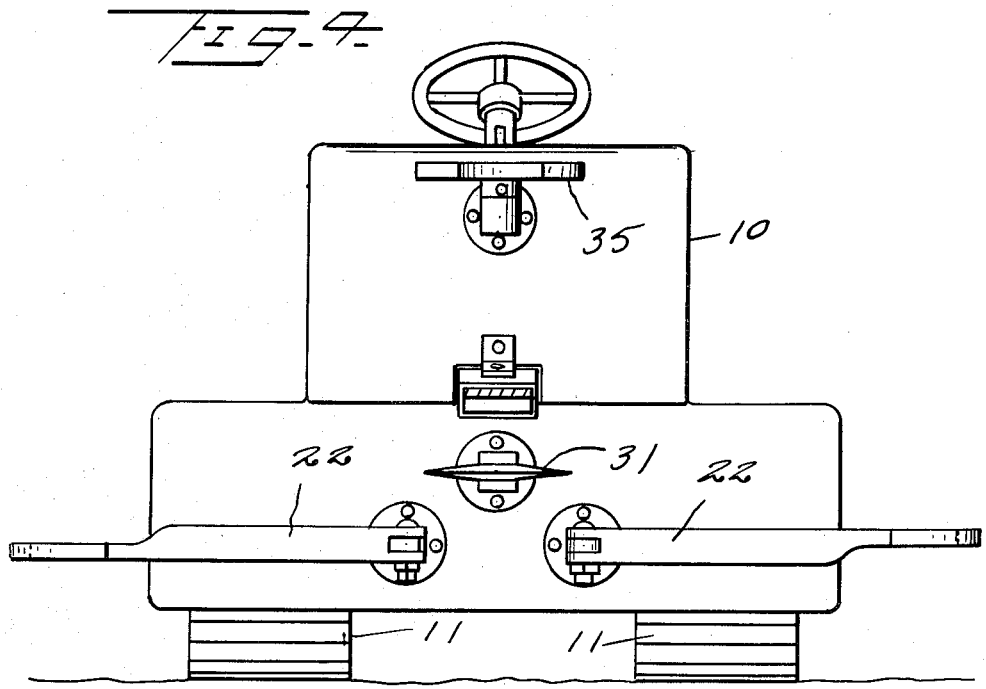
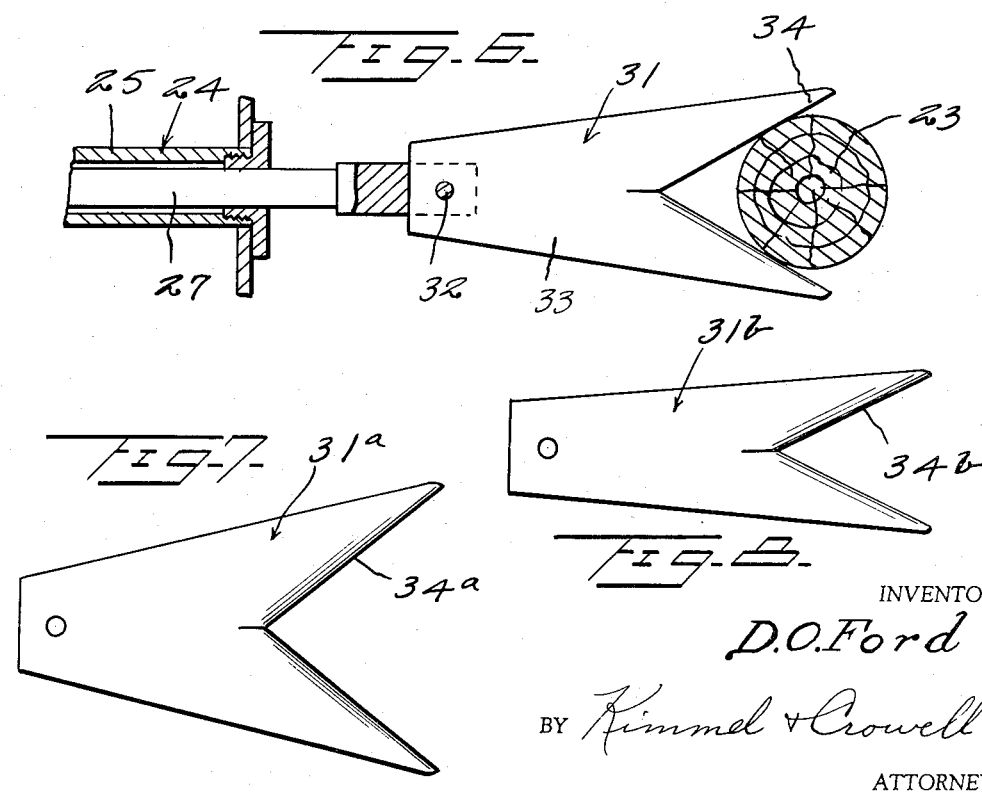
INVENTOR
D. O. Ford
BY Kimmel & Crowell
ATTORNEYS

United States Patent Office 2,748,813
Patented June 5, 1956

2,748,813

GRIPPING, CUTTING AND PUSHING TREE FELLING MACHINE

David O. Ford, San Antonio, Tex.

Application November 23, 1953, Serial No. 393,725

6 Claims. (Cl. 144—34)

This invention relates to a tree felling machine.

An object of this invention is to provide a machine which will easily and quickly cut off a tree and fell the same in the desired position.

Another object of this invention is to provide a tree felling machine which includes a hydraulically operated cutter with a pair of clamping hooks for gripping the tree adjacent the base of the tree so that the tree will be held against movement during the cutting and felling operation.

A further object of this invention is to provide in a machine of this type an improved means for effecting felling of the tree in the desired direction.

A further object of this invention is to provide a tree felling machine which is of the tractor type so that the machine can be readily moved to the desired location.

With the above and other objects in view, my invention consists in the arrangement, combination and details of construction disclosed in the drawings and specification, and then more particularly pointed out in the appended claims.

In the drawings:

Figure 1 is a detailed side elevation partly broken away and in section of a tree felling machine constructed according to an embodiment of this invention.

Figure 2 is a plan view of the machine.

Figure 3 is a fragmentary longitudinal section of the machine.

Figure 4 is a detailed front elevation of the machine.

Figure 5 (Sheet 2) is a fragmentary sectional view taken on the line 5—5 of Figure 3.

Figure 6 is a fragmentary sectional view taken on the line 6—6 of Figure 3.

Figure 7 is a plan view of an enlarged cutting blade.

Figure 8 is a plan view of a relatively small cutting blade.

Figure 9 (Sheet 3) is a fragmentary sectional view taken on the line 9—9 of Figure 3.

Referring to the drawings, the numeral 10 designates generally a tractor which is provided with endless traction treads 11. The tractor 10 has mounted in the body 13 thereof a pair of horizontally disposed hydraulic cylinders 14 which are connected together at their front and rear portions by connecting pipes 15 and 16 (Fig. 9) respectively.

The hydraulic members 14 include cylinders 17 having a piston 18 slidable therein with a piston rod 19 projecting forwardly through a gland 20. Each piston or plunger rod 19 has pivotally secured thereto as at 21 a tree gripping hook 22, and the two hooks 22 are oppositely disposed so as to engage about a tree 23, as more clearly shown in Figure 5.

When fluid is admitted to the forward ends of the cylinders 17 through the connecting pipe 16, the pistons 18 will be moved rearwardly so that the tractor 10 will be held against rearward movement with respect to the tree 13. A blade operating hydraulic member 24 is disposed above the hydraulic members 14 and is formed of a cylinder 25 having a piston 26 (Fig. 3) slidable therein.

A forwardly projecting rod 27 extends through a gland 28.

The cylinder 25 has pipe connections 29 and 30 at the rear and forward ends respectively, for admitting fluid under pressure to move the piston 26 lengthwise of the cylinder 25. A cutting blade generally indicated at 31 is secured by removable fastening means 32 to the forward end of the plunger rod 27.

The blade 31 is formed of a forwardly tapering plate 33 having a V-shaped cutting portion 34. The V-shaped cutting portion 34 is adapted to engage about the tree 23, as shown in Figure 6, so that forward movement of the blade 31 will effect a shearing or cutting of the tree. A tree felling wheel 35 (Figs. 3 and 4) which is formed with a plurality of concave notches or cut-outs 36 is disposed above the blade 31 and is rotatably carried by a plunger 37 slidable in the guide 38.

The wheel 35 is fixed to a vertical shaft 39 having a sprocket 40 at its lower end about which a chain 41 engages. The guide 38 is formed with a longitudinal slot 42 in the lower side thereof. A second vertical shaft 43 extends through the rear portion of the plunger 37 and has a rear sprocket 44 fixed thereon and about which the chain 41 engages. The shaft 42 has fixed thereon a beveled gear 45 which meshes with a beveled gear 46 fixed to a horizontal shaft 47.

An L-shaped bracket 48 engages the two shafts 43 and 47 so as to provide a bearing for these shafts, and an additional bearing 49 is mounted at the forward end of shaft 47 and is provided with a boss 50 in which the lower end of shaft 43 rotatably engages. The shaft 47 is provided with a tubular internally splined rear portion 51 within which a splined shaft 52 engages.

The shaft 52 has fixed on the rear portion thereof a worm gear 53 with which a driving worm 54 engages. The worm 54 is fixed to a shaft 55 extending from a combined clutch and reduction gear 56. The guide 38 has mounted therein a spring 57 bearing at its forward end against the rear of the plunger 37 and the rear end of the spring 57 bears against a cap 58 mounted on the rear of the guide 38.

In order that the operator of the machine may be able to see the progress of the cutting blade 31 a periscope 59 is mounted in the body 13 and terminates at its forward end above the blade 31. The rear end of the periscope 59 is disposed adjacent the steering wheel 60 as indicated at 61 (Fig. 1).

In Figure 7, there is disclosed a cutting blade 31a which is similar in construction to the blade 31 with the exception that the V-shaped cutting portion 34a is relatively wider so that the blade 31a may be used with a larger diameter tree.

In Figure 8, there is disclosed another cutting blade 31b which is smaller than the blade 31, and the V-shaped cutting portion 34b is disposed on a reduced angle for use with a relatively small diameter tree.

In the use and operation of this machine, the tractor 10 is moved to a point adjacent the tree 23 and the hooks 22 are engaged about the base of the tree below the point where the blade 31 will cut the trunk. The hydraulic pistons 18 are then locked against movement in the cylinders 17 and the tree felling wheel 35 is disposed under spring pressure against the tree 23 at a point above the blade 31. Blade 31 is then moved forwardly in a horizontal plane to the trunk of the tree 23.

When the trunk of the tree 23 is substantially cut, wheel 35 may be rotated in the desired direction so that the tree will drop either to the right or the left of the machine, as viewed in Figure 2. If the tree is to be felled forwardly spring-pressed plunger 37 will force the tree to drop forwardly.

The machine hereinbefore described will provide a means whereby trees may be felled without sawing or

What is claimed is:

1. A tree cutting and felling machine comprising a mobile tractor, a pair of tree embracing and gripping hooks, hydraulic means carried by said tractor connected with said hooks whereby said tractor may be drawn to said tree and held against movement relative to said tree, a second horizontally disposed hydraulic means carried by said tractor, a longitudinally movable tree cutting knife blade carried by said second hydraulic means, and horizontally movable means carried by the tractor engageable with the tree above said blade for effecting felling of the tree in a selected predetermined direction.

2. A tree cutting and felling machine as set forth in claim 1 wherein said blade is formed with a pair of forwardly divergent keen edges.

3. A tree cutting and felling machine comprising a mobile tractor, horizontal hydraulic means carried by said tractor, a pair of tree gripping hooks pivotally carried by and extending forwardly of said hydraulic means, a second horizontal hydraulic means carried by said tractor above and substantially parallel to said first named hydraulic means, a forwardly projecting cutting blade carried by said second hydraulic means, a spring-pressed shaft, substantially horizontal guide means slidably mounting said shaft on said tractor above said second hydraulic means, a notched tree pressing wheel, means mounting said wheel on the forward end of said shaft for rotation about a vertical axis, means for rotating said wheel whereby the tree will fall in the desired direction, pull on said hooks effecting tensioning of the spring pressing said shaft.

4. A tree cutting and felling machine comprising a mobile tractor, a pair of tree embracing and gripping hooks attached to said tractor, hydraulic means connected to said hooks for drawing said hooks toward said tractor, rotatable means mounted for longitudinal movement on said tractor and engageable with said tree for effecting felling of said tree in a selected predetermined direction, the engagement of said rotatable means with said tree being effected and maintained by said hydraulic means drawing said hooks, and a hydraulically actuated longitudinally movable tree-cleaving knife blade mounted between said hooks and said rotatable means.

5. A device as claimed in claim 4 in which said rotatable means is spring biased toward said tree.

6. A device as claimed in claim 5 in which means are provided to rotate said rotatable means as the tree is being felled whereby the tree may be felled in a selected predetermined direction.

References Cited in the file of this patent

UNITED STATES PATENTS

| | | |
|---|---|---|
| 944,555 | Holden | Dec. 28, 1909 |
| 957,832 | Wise | May 10, 1910 |
| 1,399,274 | Radimak | Dec. 6, 1921 |
| 1,414,319 | Zaiauskis | Apr. 25, 1922 |
| 2,341,035 | Grzelak | Feb. 8, 1944 |
| 2,378,554 | Irwin | June 19, 1945 |
| 2,411,623 | Jaques | Nov. 26, 1946 |
| 2,426,694 | King | Sept. 2, 1947 |
| 2,529,934 | Gracey et al. | Nov. 14, 1950 |
| 2,542,952 | White | Feb. 20, 1951 |
| 2,619,994 | Lower | Dec. 2, 1952 |

FOREIGN PATENTS

| | | |
|---|---|---|
| 1,068 | Great Britain | Apr. 28, 1864 |